United States Patent
Kojo et al.

(10) Patent No.: US 8,979,173 B2
(45) Date of Patent: Mar. 17, 2015

(54) VEHICLE BODY FLOOR STRUCTURE FOR AUTOMOBILE

(71) Applicant: Honda Motor Co., Ltd., Minato-ku, Tokyo (JP)

(72) Inventors: Yuki Kojo, Saitama (JP); Tomohide Sekiguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 13/802,976

(22) Filed: Mar. 14, 2013

(65) Prior Publication Data

US 2013/0257097 A1   Oct. 3, 2013

(30) Foreign Application Priority Data

Mar. 29, 2012 (JP) ................ 2012-075844
Mar. 29, 2012 (JP) ................ 2012-075845

(51) Int. Cl.
  *B62D 21/15* (2006.01)
  *B62D 25/20* (2006.01)
(52) U.S. Cl.
  CPC ............ *B62D 21/15* (2013.01); *B62D 25/2036* (2013.01)
  USPC .................................................. 296/187.08
(58) Field of Classification Search
  CPC ............................ B62D 21/15; B62D 25/2036
  USPC .................................................... 296/187.08
  See application file for complete search history.

(56) References Cited

U.S. PATENT DOCUMENTS 5,352,011 A * 10/1994 Kihara et al. ............ 296/203.03
7,731,274 B2   6/2010 Kishima et al.

FOREIGN PATENT DOCUMENTS

| JP | S60-192976 U | 12/1985 |
| JP | S61-44371 U | 3/1986 |
| JP | S62-71 U | 1/1987 |
| JP | H07-165122 A | 6/1995 |
| JP | H09-24863 A | 1/1997 |
| JP | H10-338161 A | 12/1998 |
| JP | 2003-237636 A | 8/2003 |
| JP | 2004-352137 A | 12/2004 |

(Continued)

OTHER PUBLICATIONS

Official Communication (Decision of Granting a Patent) dated Jan. 22, 2014 issued over the corresponding JP Patent Application 2012-075845.

(Continued)

*Primary Examiner* — Glenn Dayoan
*Assistant Examiner* — Melissa A Black
(74) *Attorney, Agent, or Firm* — Carrier Blackman & Associates, P.C.; Joseph P. Carrier; William D. Blackman

(57) ABSTRACT

A vehicle body floor structure for an automobile, includes a joint line extending in a vehicle width direction and connecting a rear edge of a dashboard lower panel and a front edge of a front floor panel, a side sill extending in a front-rear direction and connected to an outer edge in the vehicle width direction of each of the dashboard lower panel and the front floor panel, a floor frame member extending in the front-rear direction and connected to the dashboard lower panel and an upper surface of the front floor panel on a side inward of the side sill in the vehicle width direction, and a floor gusset extending in the vehicle width direction, connecting the side sill and the floor frame member, and disposed on the upper surface of the front floor panel along the joint line.

19 Claims, 13 Drawing Sheets

(56) References Cited

FOREIGN PATENT DOCUMENTS

| JP | 2005-219521 A | 8/2005 |
|----|---------------|--------|
| JP | 2007-015443 A | 1/2007 |
| JP | 2007-269052 A | 10/2007 |
| JP | 2008-094135 A | 4/2008 |
| JP | 2010-155509 A | 7/2010 |
| JP | 2012-011828 A | 1/2012 |
| JP | 2012-011856 A | 1/2012 |

OTHER PUBLICATIONS

Official Communication (Decision of Granting a Patent) dated Jan. 15, 2014 issued over the corresponding JP Patent Application 2012-075844.

* cited by examiner

FRONT ←

VEHICLE BODY FLOOR STRUCTURE FOR AUTOMOBILE

CROSS-REFERENCE TO RELATED APPLICATIONS

The present application claims priority under 35 USC 119 to Japanese Patent Application Nos. 2012-75844 and 2012-75845 filed on Mar. 29, 2012 the entire contents of which are hereby incorporated by reference.

BACKGROUND OF THE INVENTION

1. Field of the Invention

The present invention relates to a vehicle body floor structure for an automobile, in which a rear edge of a dashboard lower panel and a front edge of a front floor panel are connected on a joint line extending in a vehicle width direction, an outer edge in the vehicle width direction of each of the dashboard lower panel and the front floor panel is connected to a side sill extending in a front-rear direction, and a floor frame extending in the front-rear direction is connected to the dashboard lower panel and an upper surface of the front floor panel on a side inward of the side sill in the vehicle width direction.

2. Description of the related art

There is a concern that when an automobile is involved in a narrow offset frontal impact, a large impact load is inputted from one of left and right front side frames to a front portion of one of left and right side sills, and a vehicle compartment space is made narrow because the front portion of the side sill deforms in such a way as to fall toward the inside in a vehicle width direction.

Addressing such concern, Japanese Patent Application Laid-open No. 2003-237636 discloses a known structure in which a diagonal member extending diagonally rearward and toward an inner side in a vehicle width direction from a front end of a side sill is connected to a floor frame. With such structure, a load which tends to cause the side sill to fall toward the inside in the vehicle width direction is transmitted to the floor frame through the diagonal member, and the fall of the side sill is prevented by reaction force which the diagonal member receives from the floor frame.

Incidentally, a rear edge of a dashboard lower panel and a front edge of a front floor panel are spot-welded to each other while superposed on each other along a joint line extending in the vehicle width direction. Here, waterproof treatment for applying a dust sealer to the joint line is necessary in order to prevent water from entering the inside of a vehicle compartment from a gap between welding points.

However, the known structure described in Japanese Patent Application Laid-open No. 2003-237636 mentioned above has a disadvantage that since the diagonal member disposed in the diagonal direction crosses over the joint line, work for applying the dust sealer to the joint line is hindered by the diagonal member.

SUMMARY OF THE INVENTION

The present invention has been made in view of the above circumstances, and an object thereof is to provide a vehicle body floor structure which enables the application of a dust sealer to a joint line between a dashboard lower panel and a front floor panel while preventing a front portion of a side sill from falling inward in a vehicle width direction because of an impact load.

In order to achieve the object, according to a first feature of the present invention, there is provided a vehicle body floor structure for an automobile comprising: a dashboard lower panel and a front floor panel which are connected on a joint line extending in a vehicle width direction between a rear edge of the dashboard lower panel and a front edge of the front floor panel, a side sill extending in a front-rear direction which is connected to an outer edge in the vehicle width direction of each of the dashboard lower panel and the front floor panel, a floor frame extending in the front-rear direction which is connected to the dashboard lower panel and an upper surface of the front floor panel on a side inward of the side sill in the vehicle width direction, and a floor gusset extending in the vehicle width direction which connects the side sill and the floor frame and is disposed on the upper surface of the front floor panel along the joint line.

With the above configuration, the side sill and the floor frame are connected by the floor gusset extending in the vehicle width direction. For this reason, if an impact load of a narrow offset frontal impact is inputted to a front end of the side sill that would normally cause the side sill to fall toward the inside in the vehicle width direction in the conventionally known structure, such impact load is transmitted to the floor frame through the floor gusset in the structure of the present invention, and the fall of the side sill can be prevented by reaction force which the floor gusset receives from the floor frame. Moreover, the floor gusset is disposed on the upper surface of the front floor panel along the joint line between the rear edge of the dashboard lower panel and the front edge of the front floor panel. For this reason, the joint line is prevented from being covered with the floor gusset, and thus work of applying a dust sealer to the joint line can be achieved without obstruction.

According to a second feature of the present invention, in addition to the first feature, the floor gusset is connected, with bolts, to an inner surface in the vehicle width direction of the side sill and an upper surface of the floor frame.

With the above configuration, the floor gusset is connected, with bolts, to the inner surface in the vehicle width direction of the side sill and the upper surface of the floor frame. For this reason, not only is the attachment work of the floor gusset facilitated, but also the floor gusset can be conveniently attached after the dust sealer is applied to the joint line between the dashboard lower panel and the front floor panel. Thus, the application work of the dust sealer is further facilitated.

According to a third feature of the present invention, in addition to the first feature, the floor gusset has a closed section and is formed by connecting a first member forming an upper wall to a second member forming a lower wall, a front wall and a rear wall. Particularly, a first connection portion formed by upwardly bending an outer end in the vehicle width direction of the upper wall is connected to an inner surface in the vehicle width direction of the side sill, a second connection portion formed by extending an inner end in the vehicle width direction of the upper wall inward in the vehicle width direction is connected to an upper surface of the floor frame, and a side wall formed by upwardly bending an inner end in the vehicle width direction of the lower wall is made to face an outer surface in the vehicle width direction of the floor frame.

With the above configuration, the floor gusset has a closed section and is obtained by connecting the first member which is a press product forming the upper wall to the second member which is a press product forming the lower wall, the front wall and the rear wall. For this reason, a high-strength steel plate capable of being press-formed can be used, and thus the strength of the floor gusset is increased. Moreover, the first connection portion which is formed by upwardly bending the outer end in the vehicle width direction of the upper wall is connected to the inner surface in the vehicle width direction of the side sill, the second connection portion which is formed by extending the inner end in the vehicle width direction of the upper wall inward in the vehicle width direction is connected to the upper surface of the floor frame, and the side wall which is formed by upwardly bending the inner end in the vehicle width direction of the lower wall is made to face an outer surface in the vehicle width direction of the floor frame. For this reason, a load inputted from a front end of the side sill and acting inwardly in the vehicle width direction is reliably transmitted to the floor frame, and thus sufficient reaction force can be generated to counteract the impact load.

According to a fourth feature of the present invention, in addition to the third feature, a third connection portion formed by bending an upper end of the side wall inwardly in the vehicle width direction is connected to the upper surface of the floor frame while superposed on the second connection portion.

With the above configuration, the third connection portion which is formed by bending the upper end of the side wall inwardly in the vehicle width direction is connected to the upper surface of the floor frame while superposed on the second connection portion. For this reason, the floor frame and the floor gusset are firmly connected to each other, and sufficient reaction force can be generated from the floor frame to the floor gusset to counteract the impact load.

According to a fifth feature of the present invention, in addition to the third feature, a bulge portion which bulges downward is formed on the lower wall continuous to an outer side in the vehicle width direction of the side wall.

With the above configuration, the bulge portion bulging downward is formed on the lower wall continuous to the outer side in the vehicle width direction of the side wall. For this reason, sufficient reaction force to counteract the impact load can be generated from the floor frame to the floor gusset by increasing the height of the side wall by the bulge portion. Moreover, a space for disposing an adhesive melt sheet can be secured between the lower wall and the front floor panel.

According to a sixth feature of the present invention, in addition to the third feature, the second connection portion is connected to the upper surface of the floor frame with a bolt, and a bead which projects to the same height as a head portion of the bolt and extends in the vehicle width direction is formed on the upper wall.

With the above configuration, the bead which extends in the vehicle width direction is formed on the upper wall. For this reason, not only can the fall of a front end of the side sill be more reliably prevented by increasing the stiffness of the floor gusset by the bead, but also the bead does not affect a floor carpet laid on an upper surface of the front floor panel, since the protrusion height of the bead is equal to that of the head portion of the bolt connecting the second connection portion to the upper surface of the floor frame.

According to a seventh feature of the present invention, in addition to the third feature, a bead which extends in the vehicle width direction is formed on the lower wall.

With the above configuration, the bead extending in the vehicle width direction is formed on the lower wall. For this reason, the stiffness of the floor gusset is increased by the bead, and the fall of the front end of the side sill can be more reliably prevented.

According to an eighth feature of the present invention, in addition to any one of the third to seventh features, a gap is formed at a connection portion between the gusset upper wall (first member) and the gusset lower wall (second member).

With the above configuration, the gap is formed between a connection portion of the first member and the second member. For this reason, when the vehicle body is immersed in a basin of a rust-preventing electrodeposition paint, the electrodeposition paint can be reliably infiltrated into the inside of the floor gusset via the gap.

According to a ninth feature of the present invention, in addition to the first feature, the frame member includes an end portion which is joined to a side wall, on an inside in the vehicle width direction, of the side sill, and in a cross section orthogonal to a front-rear axis of the vehicle body, a joint portion between the side sill and the frame member is located near a Y-shaped intersection portion formed by a first reinforcement member which is superposed on an inner surface of the side sill, and a second reinforcement member which is superposed on a lower surface of the front floor panel.

With the above configuration, the end portion of the frame member is joined to the side wall on an inner side in the vehicle width direction of the side sill. In a cross section orthogonal to the front-rear axis of the vehicle body, the joint portion between the side sill and the frame member is located near the Y-shaped intersection portion formed by the first reinforcement member which is superposed on the inner surface of the side sill, and the second reinforcement member which is superposed on the lower surface of the front floor panel. For this reason, if one of the left and right side sills receives the input of a large impact load of an offset frontal impact that would normally move the side sill to the rear in the conventionally known vehicle body floor structure, the side sill can be prevented from moving to the rear and bending in the structure of the present invention since the joint portion between the frame member and the side sill where stress concentration easily occurs is reinforced by the first and second reinforcement members. Moreover, since the first and second reinforcement members reinforce only the joint portion between the side sill and the frame member, an increase in weight can be reduced to a minimum.

According to a tenth feature of the present invention, in addition to the ninth feature, the first reinforcement member has an L-shaped section formed of a longitudinal wall and a lateral wall. The longitudinal wall is welded to an inner surface of the side wall of the side sill, the lateral wall is welded to a portion on an outer side in the vehicle width direction of the second reinforcement member with a lower wall of the side sill interposed therebetween, and a portion on an inner side in the vehicle width direction of the second reinforcement member is welded to the frame member with the front floor panel interposed therebetween.

With the above configuration, the first reinforcement member is formed from the longitudinal wall and the lateral wall, and has an L-shaped cross section. The longitudinal wall is welded to the inner surface of the side wall of the side sill. The lateral wall is welded to the portion on the outer side in the vehicle width direction of the second reinforcement member with the lower wall of the side sill interposed therebetween. The portion on the inner side in the vehicle width direction of the second reinforcement member is welded to the frame member with the front floor panel interposed therebetween. Thereby, the lower wall of the side sill, the lateral wall of the first reinforcement member and the portion on the outer side in the vehicle width direction of the second reinforcement member are superposed one another in triple on an outer side in the vehicle width direction of the joint portion, whereas the front floor panel, and the portions on the inner sides in the vehicle width direction of the frame member and the second reinforcement member are superposed one another in triple on the inner side in the vehicle width direction of the joint portion. Thus, the strength of the joint portion between the side sill and the frame member can be increased.

According to an eleventh feature of the present invention, in addition to the ninth feature, a front end of the first reinforcement member is located frontward of a front end of the frame member in the joint portion, and a rear end of the first reinforcement member is located rearward of a rear end of the frame member in the joint portion.

With the above configuration, the front end of the first reinforcement member is located frontward of the front end of the frame member in the joint portion, and the rear end of the first reinforcement member is located rearward of the rear end of the frame member in the joint portion. Thus, a reinforcement effect can be sufficiently exerted by the first reinforcement member. According to a twelfth feature of the present invention, in addition to any one of the ninth to eleventh features, the vehicle body floor structure further comprises: a floor tunnel formed on the front floor panel; and another frame member extending in the vehicle width direction and connecting the side sill and the floor tunnel, wherein a joint portion between the other frame member extending in the vehicle width direction and the floor tunnel is reinforced by a third reinforcement member which includes a lateral wall joined to an upper wall of the frame member and a longitudinal wall joined to a side wall of the floor tunnel.

With the above configuration, the joint portion between the frame member extending inward in the vehicle width direction and the floor tunnel formed on the front floor panel is reinforced by the third reinforcement member including the lateral wall joined to the upper wall of the frame member and the longitudinal wall joined to the side wall of the floor tunnel. For this reason, an impact load inputted from the side sill to the frame member is reliably transmitted to the floor tunnel, and thus greater reaction force is generated so that the inward deformation of the side sill in the vehicle width direction can be reliably prevented by the reaction force.

According to a thirteenth feature of the present invention, in addition to the twelfth feature, the lateral wall of the third reinforcement member projecting from the upper wall of the frame member to the front and the rear is bent downward.

With the above configuration, the lateral wall of the third reinforce member projecting from the upper wall of the frame member to the front and the rear is bent downward. Thus, a floor carpet covering the third reinforcement member is prevented from being damaged by being caught at front and rear corner portions of the lateral wall.

Here, a floor frame 15 and a cross member 14 in the exemplary embodiments of the present invention discussed below correspond to the frame member and the other frame member of the present invention; and spot-welds w5, w6, w7 in the embodiments correspond to the weld of the present invention.

The above and other objects, characteristics and advantages of the present invention will be clear from detailed descriptions of the present exemplary embodiments which will be provided below while referring to the attached drawings.

BRIEF DESCRIPTION OF THE DRAWINGS

FIGS. 1 to 6 show a first embodiment of the present invention, in which:
FIG. 1 is a perspective view of a frame of a central portion of a vehicle body of an automobile;

FIG. 2 is a view seen from a direction of an arrow 2 in FIG. 1;
FIG. 3 is a sectional view taken along a line 3-3 in FIG. 2;
FIG. 4 is a sectional view taken along a line 4-4 in FIG. 2;
FIG. 5 is a sectional view taken along a line 5-5 in FIG. 2;
and
FIG. 6 is an exploded view seen from a direction of an arrow 6 in FIG. 2.
FIGS. 7 to 12 show a second embodiment of the present invention, in which:
FIG. 7 is a perspective view of a frame of a central portion of a vehicle body of an automobile;
FIG. 8 is a view seen from a direction of an arrow 8 in FIG. 7;
FIG. 9 is a sectional view taken along a line 9-9 in FIG. 8;
FIG. 10 is a view seen from a direction of an arrow 10 in FIG. 9;
FIG. 11 is a view seen from a direction of an arrow 11 in FIG. 9;
and
FIG. 12 is an enlarged view of a part indicated by an arrow 12 in FIG. 7.

DESCRIPTION OF THE PRESENT EXEMPLARY EMBODIMENTS

A first exemplary embodiment of the present invention will be described below with reference to FIGS. 1 to 6. Note that a front-rear direction, a left-right direction (vehicle width direction) and a top-bottom direction in the present specification are relative to a driver sitting on a driver seat.

Figure 1:
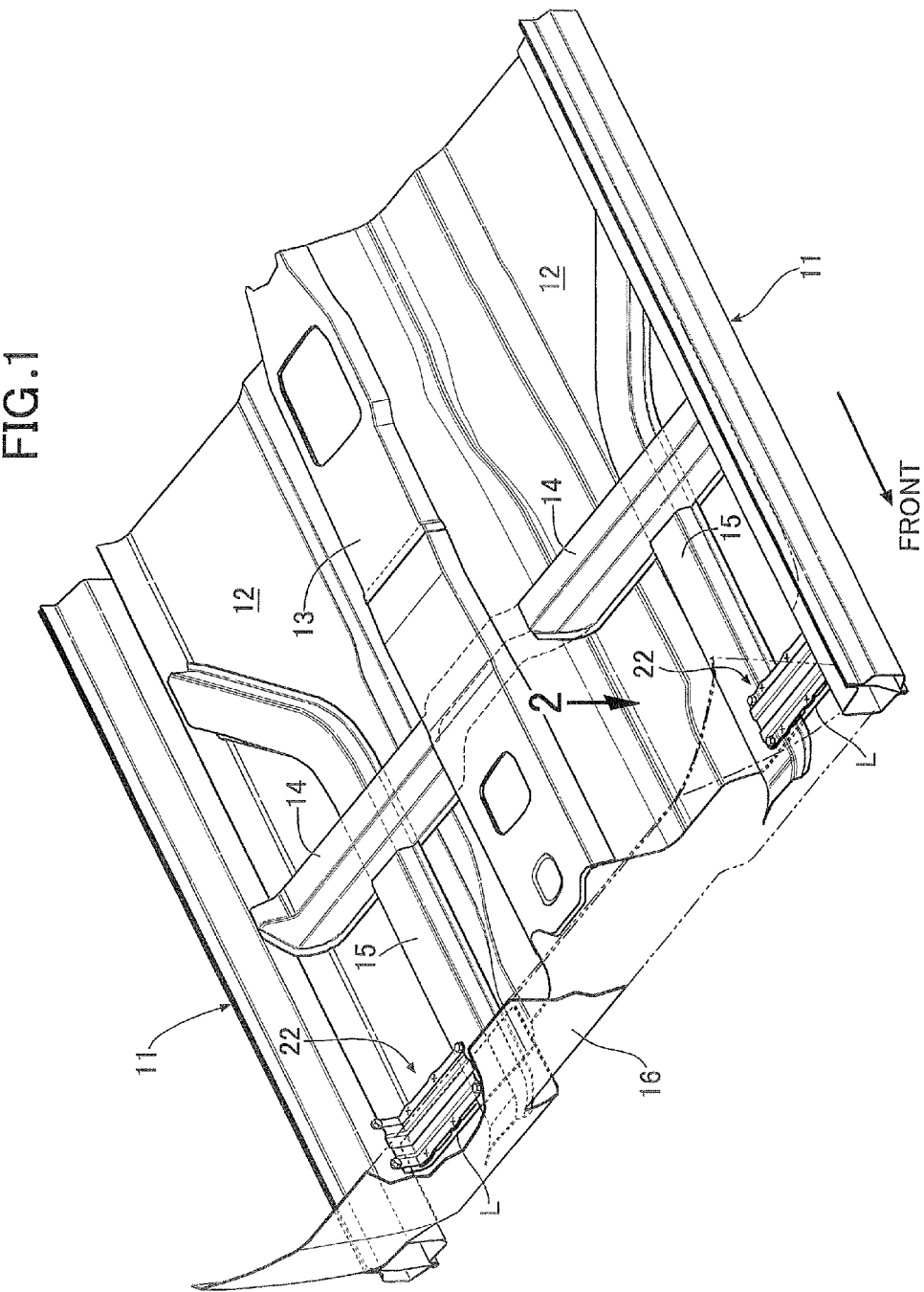
Figure 2:
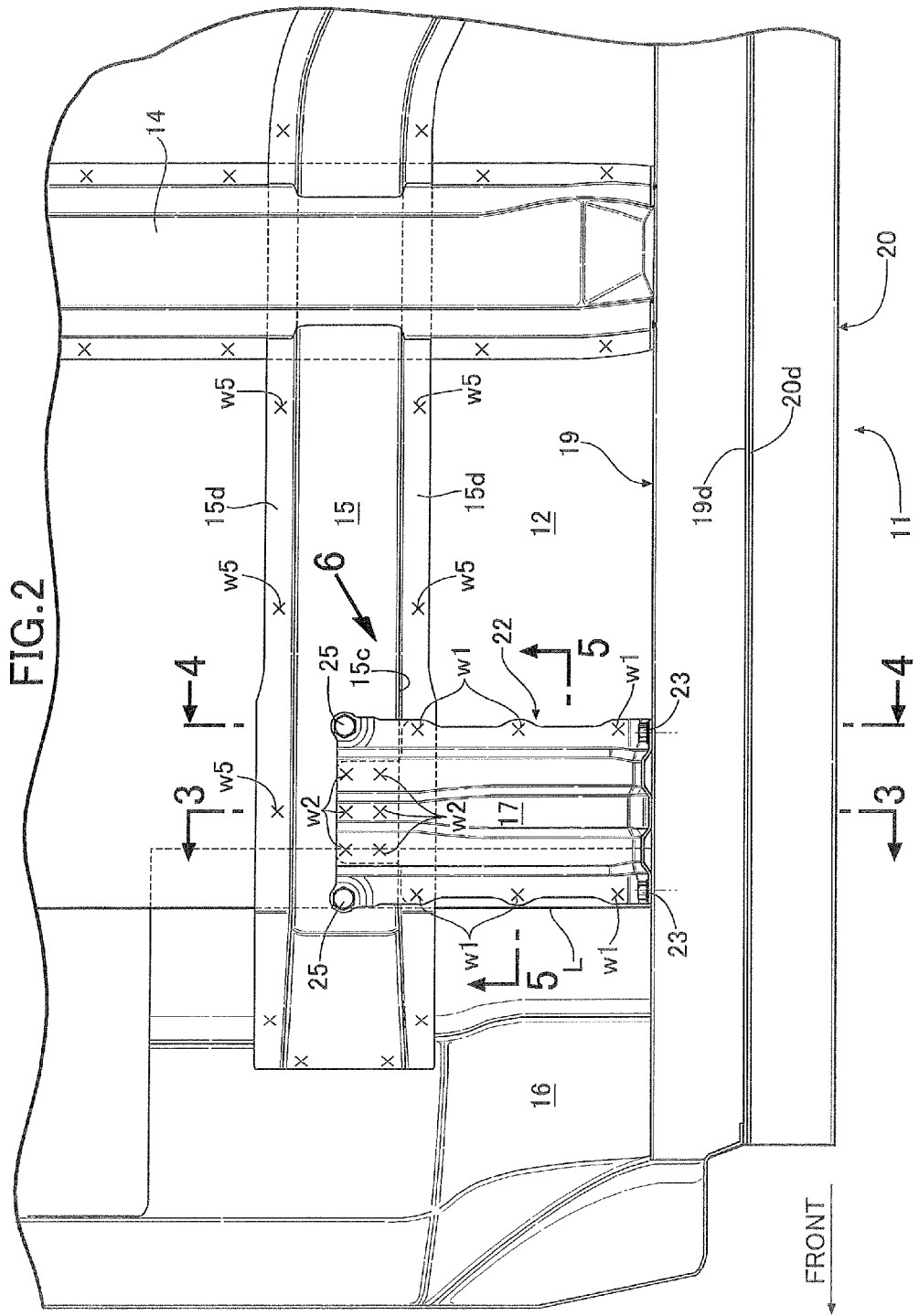
Figure 3:
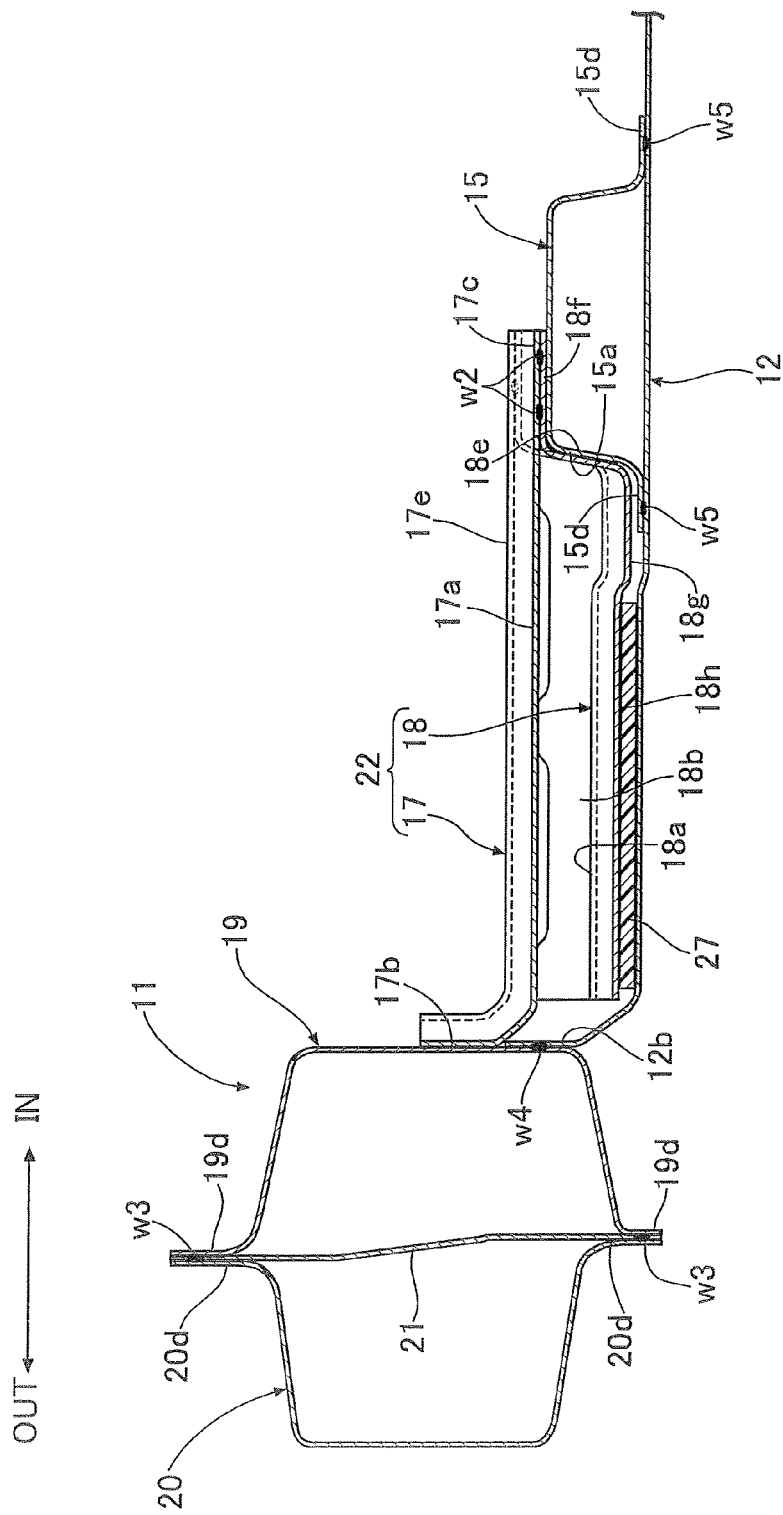

As shown in FIG. 1 and FIG. 2, a floor tunnel 13 having a reverse U-shaped cross section and extending in the front-rear direction is provided protruding upward in a central portion in the vehicle width direction of a front floor panel 12 which connects left and right side sills 11, 11. The left and right side sills 11, 11 and the floor tunnel 13 are connected by cross members 14, 14 extending in the vehicle width direction. Left and right floor frames 15, 15 extending in the front-rear direction penetrate the cross members 14, 14 from the front to the rear, and then bend toward the outside in the vehicle width direction to be connected to inner surfaces in the vehicle width direction of the side sills 11, 11. A front edge of the front floor panel 12 and a rear edge of a dashboard lower panel 16 are connected to each other while superposed on each other along a joint line L extending in the vehicle width direction. Left and right floor gussets 22, 22 are disposed in the vehicle width direction along an upper surface of the front floor panel 12 and along the rear of the joint line L. Outer ends in the vehicle width direction of the floor gussets 22, 22 are connected to inner surfaces in the vehicle width direction of the side sills 11, 11, and inner ends in the vehicle width direction of the floor gussets 22, 22 are connected to upper surfaces in the front of the floor frames 15, 15.

Next, with reference to FIG. 2 to FIG. 6, a detailed description will be given of a structure of the floor gussets 22, 22 and a structure of connection portions where left and right opposite ends of the floor gussets 22, 22 are connected to the side sills 11, 11 and the floor frames 15, 15.

Each floor gusset 22 is a member having a closed section where an upper/first member 17 and a lower/second member 18 are combined with each other. The first member 17 made by press-forming a high-strength steel plate forms an upper wall 17a. The second member 18 made by press-forming a high-strength steel plate forms a lower wall 18a, a front wall 18b and a rear wall 18c. The first member 17 includes: a flanged first connection portion 17b which is formed by upwardly bending an outer end in the vehicle width direction of the upper wall 17a; a second connection portion 17c which is formed by horizontally extending an inner end in the vehicle width direction of the upper wall 17a; joint flanges 17d, 17d which project to the front and the rear from a front edge and a rear edge of the upper wall 17a; and front and rear beads 17e, 17e which are formed on the upper wall 17a and extend in the vehicle width direction. Front and rear bolt holes 17f, 17f (see FIG. 6) are formed in the first connection portion 17b, and front and rear bolt holes 17g, 17g (see FIG. 6) are formed in the second connection portion 17c.

The second member 18 includes: joint flanges 18d, 18d which are formed by bending an upper end of the front wall 18b and an upper end of the rear wall 18c to the front and the rear, respectively; a side wall 18e which is formed by upwardly bending an inner end in the vehicle width direction of the lower wall 18a; a third connection portion 18f which is formed by bending an upper end of the side wall 18e inwardly in the vehicle width direction; a bulge portion 18g which is formed by downwardly bulging an inner portion in the vehicle width direction of the lower wall 18a continuous to a lower end of the side wall 18e; and one bead 18h which is formed on the lower wall 18a and extends in the vehicle width direction.

Lower surfaces of the joint flanges 17d, 17d in the front and the rear of the first member 17 are spot-welded w1 to upper surfaces of the joint flanges 18d, 18d in the front and the rear of the second member 18 while superposed on the upper surfaces of the joint flanges 18d, 18d. Additionally, a lower surface of the second connection portion 17c of the first member 17 is spot-welded w2 to an upper surface of the third connection portion 18f of the second member 18 while superposed on the upper surface of the third connection portion 18f. Thereby, the first member 17 and the second member 18 are integrally combined with each other to form the floor gusset 22. Here, a predetermined gap a (see FIG. 4 and FIG. 5) is formed between adjacent spot welding w1 portions between the joint flanges 17d, 17d in the front and the rear of the first member 17 and the joint flanges 18d, 18d in the front and the rear of the second member 18.

Each side sill 11 is a member having a closed section where joint flanges 19d, 19d of a side sill inner 19 and joint flanges 20d, 20d of a side sill outer 20 are welded w3 to each other with a stiffener 21 interposed therebetween. A joint flange 12b at an outer edge in the vehicle width direction of the front floor panel 12 is welded w4 to an inner surface in the vehicle width direction of the side sill inner 19. Each floor frame 15 is a member whose undersurface is opened, and which has a U-shaped cross section. Joint flanges 15d, 15d formed at left and right side edges are welded w5 to an upper surface of the front floor panel 12 while supposed on the upper surface of the front floor panel 12.

The first connection portion 17b of the first member 17 in the floor gusset 22 is superposed on an inner surface in the vehicle width direction of the side sill inner 19, and then fastened to the side sill inner 19 by two weld nuts 24, 24 and two bolts 23, 23 penetrating the bolt holes 17f, 17f. The second connection portion 17c of the first member 17 in the floor gusset 22 is superposed on an upper surface of the floor frame 15, and then fastened to the floor frame 15 by two weld nuts 26, 26 and two bolts 25, 25 penetrating the bolt holes 17g, 17g. Here, the side wall 18e of the second member 18 in the floor gusset 22 comes into contact with a side wall 15a oriented toward the outside in the vehicle width direction of the floor frame 15 (see FIG. 3 and FIG. 4).

A melt sheet 27 (see FIG. 3 to FIG. 5) which exerts an adhesive effect by being melted by heating is disposed in a space formed between a lower surface of the bead 18h on the lower wall 18a of the second member 18 in the floor gusset 22 and an upper surface of the front floor panel 12 opposed thereto.

Next, operations of the exemplary embodiment of the present invention shown in FIGS. 1-6 including the above configuration will be described.

The side sill 11 and the floor frame 15 are connected to each other by the floor gusset 22 extending in the vehicle width direction. Accordingly, if an impact load generated, for example, when an automobile causes a narrow offset frontal impact is inputted into a front end of the side sill 11, although such load would normally cause the side sill 11 to fall toward the inside in the vehicle width direction in the conventionally known structure, in the structure of the present invention the load is transmitted to the floor frame 15 through the floor gusset 22, and the fall of the side sill 11 can be prevented by reaction force which the floor gusset 22 receives from the floor frame 15.

In order to prevent water from entering the inside of a vehicle compartment from the joint line L where a front edge of the front floor panel 12 and a rear edge of the dashboard lower panel 16 are superposed and spot-welded, a dust sealer needs to be applied to the joint line L. Here, the floor gusset 22 does not cover the joint line L from above, but is disposed along the rear of the joint line L. Thereby, the floor gusset 22 is prevented from hindering the application work of the dust sealer. Moreover, after the first member 17 and the second member 18 are combined and assembled into the floor gusset 22, the floor gusset 22 is fastened to the side sill 11 and the floor frame 15 by using the bolts 23, 23, 25, 25. Thus, the floor gusset 22 can be conveniently attached after the dust sealer is applied to the joint line L, and the application work of the dust sealer is further facilitated.

In addition, the floor gusset 22 is a member having a closed section, and made by connecting the first member 17 which is a press product forming the upper wall 17a and the second member 18 which is a press product forming the lower wall 18a, the front wall 18b and the rear wall 18c. For this reason, high-strength steel plate can be used for the first member 17 and the second member 18, and thus the strength of the floor gusset 22 is increased. Moreover, the first connection portion 17b which is formed by upwardly bending the outer end in the vehicle width direction of the upper wall 17a is connected to an inner surface in the vehicle width direction of the side sill inner 19; the second connection portion 17c which is formed by extending the inner end in the vehicle width direction of the upper wall 17a inward in the vehicle width direction is connected to an upper surface of the floor frame 15; and the side wall 18e which is formed by upwardly bending the inner end in the vehicle width direction of the lower wall 18a is brought into contact with the side wall 15a on an outer side in the vehicle width direction of the floor frame 15. For this reason, a load inputted from the front end of the side sill 11 and acting inward in the vehicle width direction is reliably transmitted to the floor frame 15 through the floor gusset 22, and the fall of the side sill 11 can be more reliably prevented by generating sufficient reaction force in the floor frame 15 to surely counteract the impact load.

In this respect, the third connection portion 18f which is formed by bending the upper end of the side wall 18e of the second member 18 inwardly in the vehicle width direction is connected to the upper surface of the floor frame 15 while superposed on the second connection portion 17c of the first member 17. For this reason, the floor frame 15 and the floor gusset 22 are firmly connected to each other, and sufficient reaction force can be generated from the floor frame 15 to the floor gusset 22 to surely counteract the impact load.

Additionally, the bulge portion 18g is formed by downwardly bulging the portion of the lower wall 18a continuously to the outer side in the vehicle width direction of the side wall 18e of the second member 18. For this reason, the height of the side wall 18e is increased by the bulge portion 18g, and sufficient reaction force can be generated from the floor frame 15 to the floor gusset 22 to surely counteract the impact load (see FIG. 3 and FIG. 4). Moreover, a space for disposing the melt sheet 27 can be secured between the lower wall 18a and the front floor panel 12.

In addition, the beads 17e, 17e which extend in the vehicle width direction are formed on the upper wall 17a of the first member 17, and the bead 18h which extends in the vehicle width direction is formed on the lower wall 18a of the second member 18. For this reason, the stiffness of the floor gusset 22 is increased by the beads 17e, 17e, 18h, and the fall of the front end of the side sill 11 can be more reliably prevented. Moreover, the protrusion height of the beads 17e, 17e of the first member 17 is equal to the head portions of the bolts 25, 25 connecting the second connection portion 17c to the upper surface of the floor frame 15 (see FIG. 4 and FIG. 5). For this reason, the beads 17e, 17e do not affect a floor carpet laid on the upper surface of the front floor panel 12.

Figure 4:
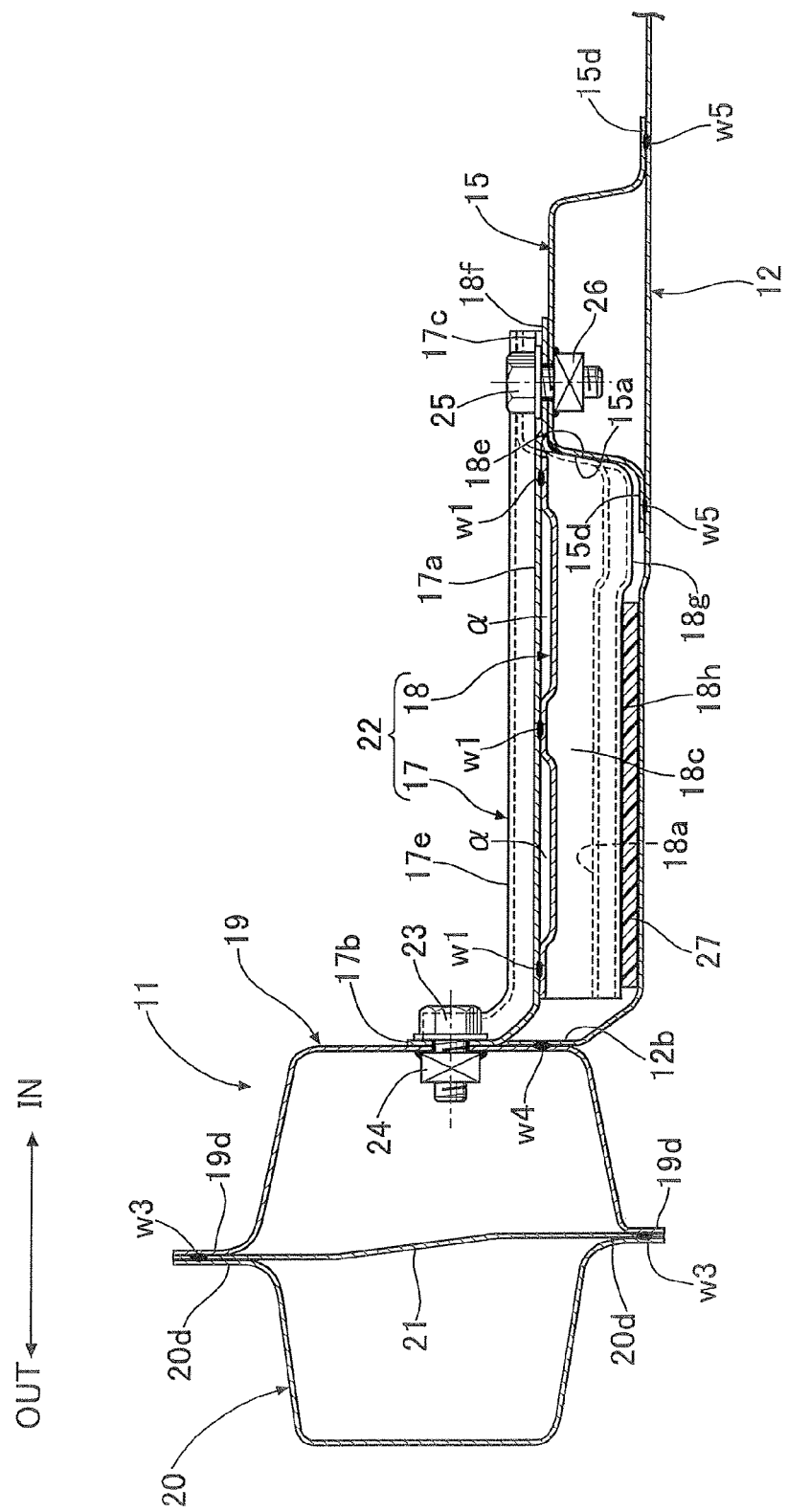
Figure 5:
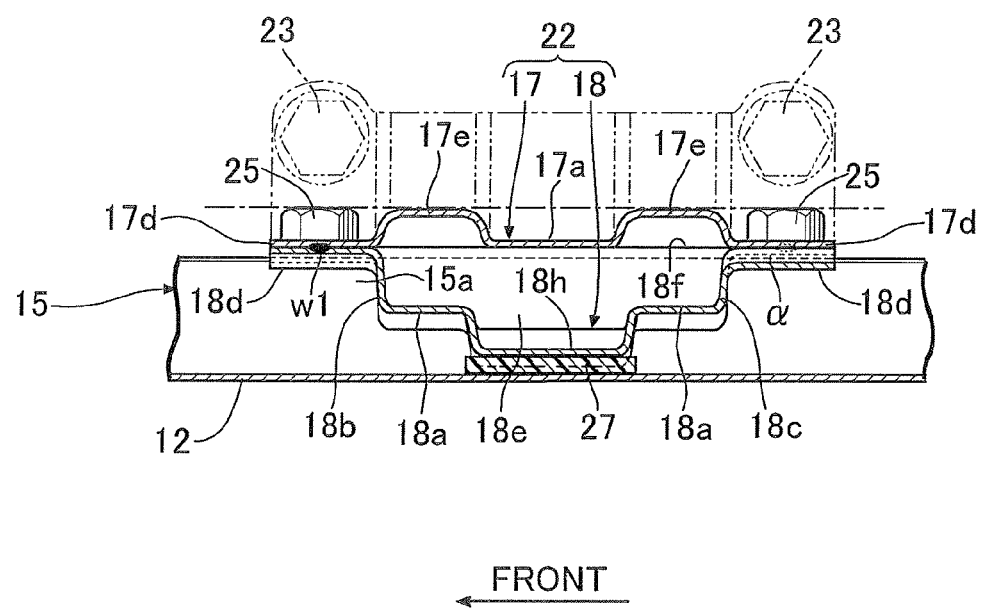
Figure 6:
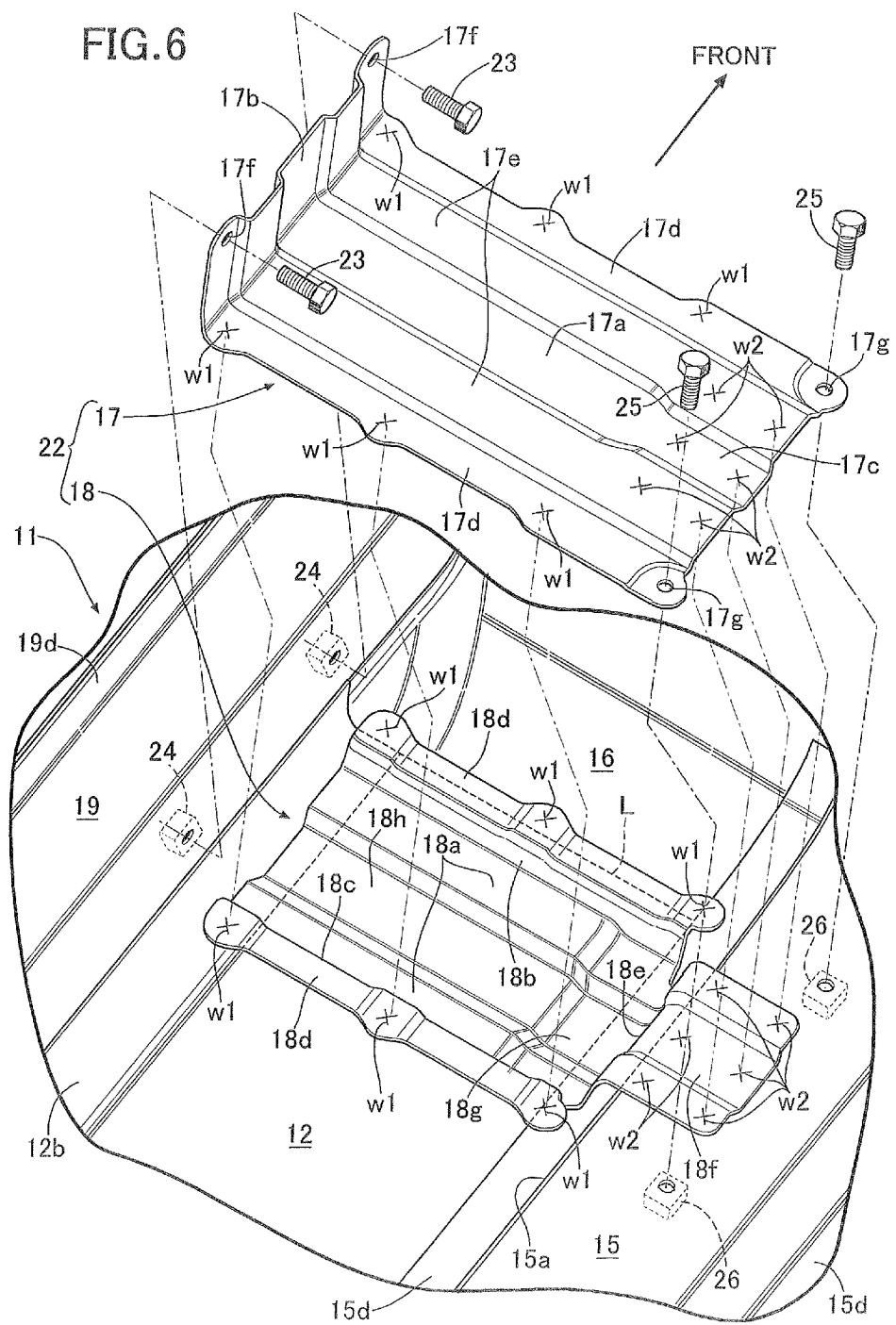

Additionally, the gap α is formed between connection portions of the joint flanges 17d, 17d of the first member 17 and the joint flanges 18d, 18d of the second member 18 (see FIG. 4 and FIG. 5). For this reason, when a vehicle body is immersed in a basin of rust-preventing electrodeposition paint, the electrodeposition paint can be reliably infiltrated into the inside of the floor gusset 22 via the gap α.

A second exemplary embodiment of the present invention will be described below with reference to FIG. 7 to FIG. 12.

Figure 7:
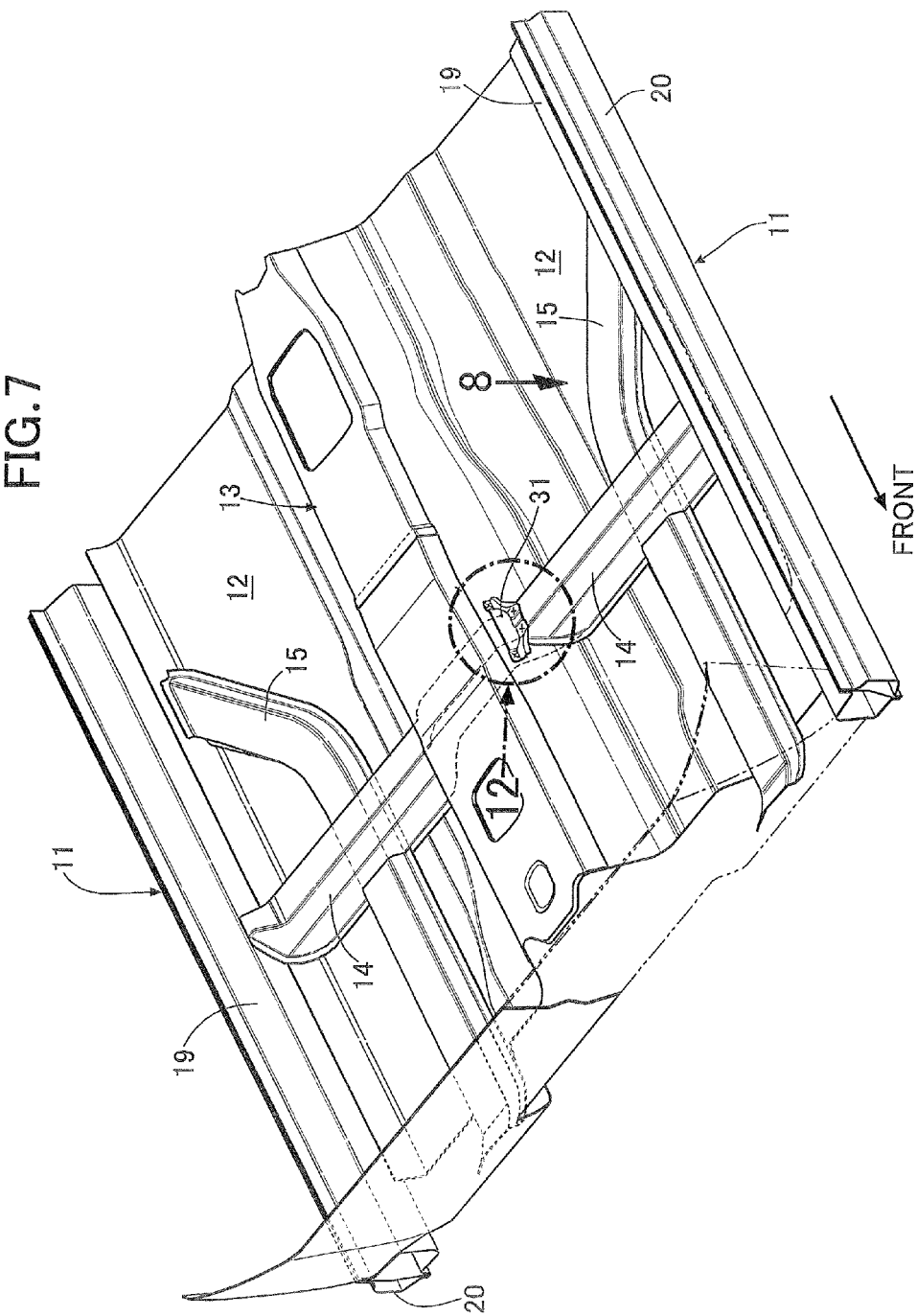
Figure 8:
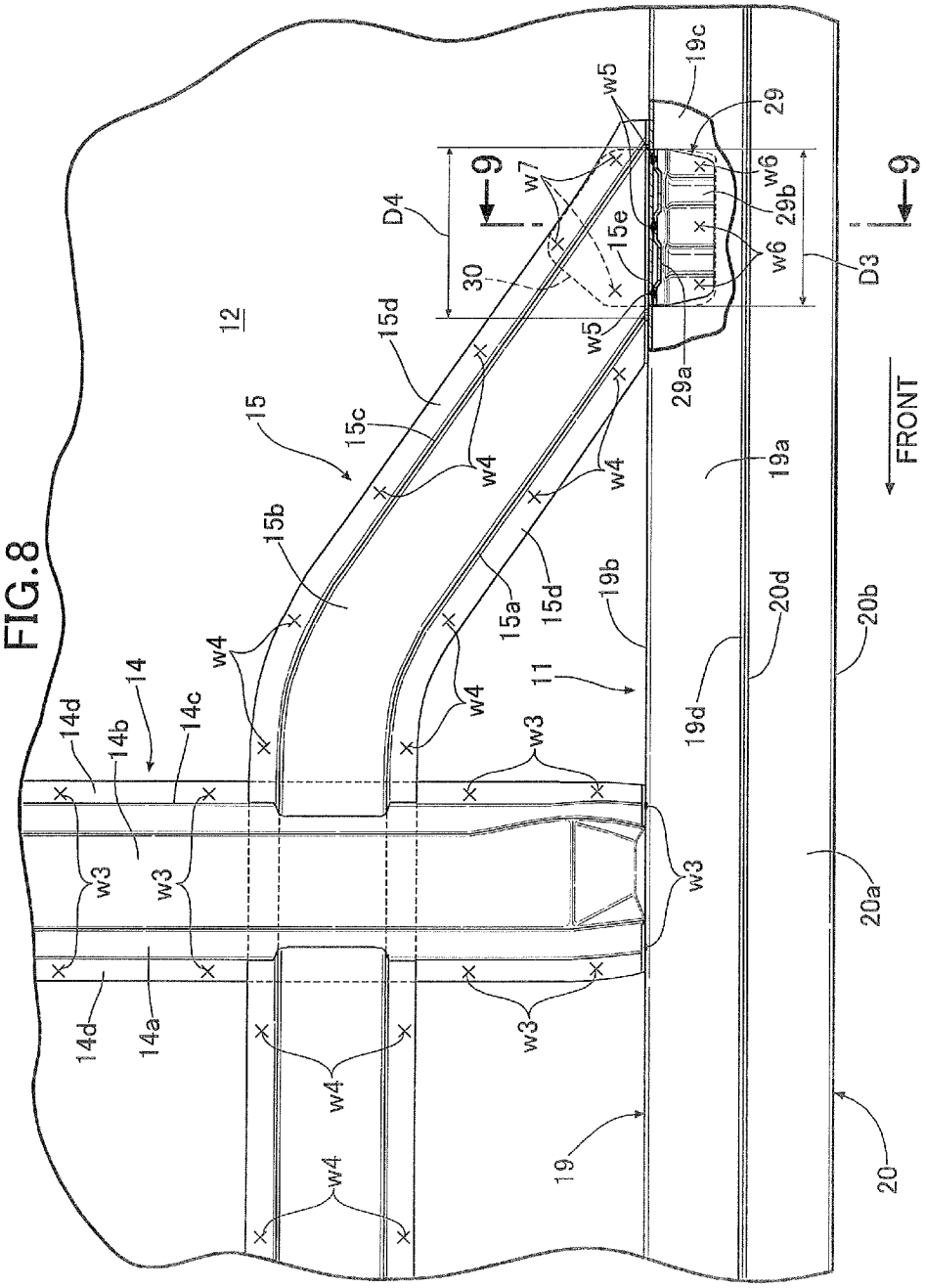

As shown in FIG. 7 and FIG. 8, a floor tunnel 13 having a reverse U-shaped cross section and extending in a front-rear direction is provided protruding upward in a central portion in a vehicle width direction of a front floor panel 12 which connects left and right side sills 11, 11. The left and right side sills 11, 11 and the floor tunnel 13 are connected together by cross members 14, 14 extending in the vehicle width direction. Left and right floor frames 15, 15 extending in the front-rear direction penetrate the cross members 14, 14 from the front to the rear, and then bend toward the outside in the vehicle width direction to be connected to inner surfaces in the vehicle width direction of the side sills 11, 11.

Next, with reference to FIG. 8 to FIG. 11, a detailed description will be given of a structure of a joint portion where a rear end of each floor frame 15 is connected to the corresponding side sill 11.

The side sill 11 is formed of: a side sill inner 19 including an upper wall 19a, a side wall 19b, a lower wall 19c, and upper and lower joint flanges 19d, 19d; a side sill outer 20 including an upper wall 20a, a side wall 20b, a lower wall 20c, and upper and lower joint flanges 20d, 20d; and a stiffener 21. The side sill 11 is formed having a closed section by spot-welding w1 (see FIG. 9) the joint flanges 19d, 19d of the side sill inner 19 and the joint flanges 20d, 20d of the side sill outer 20 with an upper edge and a lower edge of a stiffener 21 interposed therebetween. A joint flange 12b which is formed by upwardly bending an outer edge in the vehicle width direction of the front floor panel 12 through an inclined wall 12a is spot-welded w2 (see FIG. 9) to the side wall 19b of the side sill inner 19.

Each cross member 14 is a member having a U-shaped cross section, opened downward, and including a front wall 14a, an upper wall 14b and a rear wall 14c. Joint flanges 14d, 14d which extend respectively from the front wall 14a and the rear wall 14c in the front-rear direction are spot-welded w3 (see FIG. 8 and FIG. 12) to an upper surface of the front floor panel 12, the side wall 19b of the side sill inner 19 and a side wall 13a of the floor tunnel 13.

The floor frames 15 have rear ends which bend outwardly in the vehicle width direction. Each frame 15 is a member having a U-shaped cross section, opened downward, and including a side wall 15a, an upper wall 15b and a side wall 15c. Joint flanges 15d, 15d which extend respectively from the side wall 15a and the side wall 15c in a left-right direction are spot-welded w4 (see FIG. 8) to the upper surface of the front floor panel 12. The height of the floor frame 15 is lower than the height of the cross member 14. The floor frame 15 extending in the front-rear direction penetrates, from the front to the rear, a lower portion of the cross member 14 extending in the vehicle width direction. Thereafter, the floor frame 15 bends toward the outside in the vehicle width direction, and is connected to the side wall 19b of the side sill inner 19.

A joint portion between the floor frame 15 and the side sill 11 is reinforced by a first reinforcement member 29 and a second reinforcement member 30. The first reinforcement member 29 is a member having an L-shaped cross section, and including a longitudinal wall 29a and a lateral wall 29b. The longitudinal wall 29a including beads 29c, 29c and lightening holes 29d . . . is spot-welded w5 (see FIG. 9 and FIG. 10) to an inner surface of the side wall 19b of the side sill inner 19. The lateral wall 29b including beads 29e, 29e is spot-welded w6 (see FIG. 9 and FIG. 10) to an upper surface of the lower wall 19c of the side sill inner 19.

The second reinforcement member 30 is a member having a crank-shaped cross section, and including a first lateral wall 30a, an inclined wall 30b and a second lateral wall 30c. The first lateral wall 30a is spot-welded w7 (see FIG. 8, FIG. 9 and FIG. 11) to a lower surface of the front floor panel 12. Here, the rear-side joint flange 15d of the floor frame 15 which is superposed on an upper surface of the front floor panel 12 is welded at the same time by part of the spot-welding w7 (see FIG. 9). The inclined wall 30b of the second reinforcement member 30 extends toward the outside in the vehicle width direction along a lower surface of the inclined wall 12a of the front floor panel 12. The second lateral wall 30c continuous to the inclined wall 30b is superposed on a lower surface of the lower wall 19c of the side sill inner 19, and is welded at the same time by the spot-welding w6 (see FIG. 9). Beads 30d . . . extending in the vehicle width direction are formed on the second lateral wall 30c of the second reinforcement member 30.

In addition, a joint flange 15e raised upward from an outer end in the vehicle width direction of the upper wall 15b of the floor frame 15 is superposed on the joint flange 12b of the front floor panel 12, and is welded at the same time by the spot-welding w2 (see FIG. 9) to the side wall 19b of the side sill inner 19.

Figure 9:
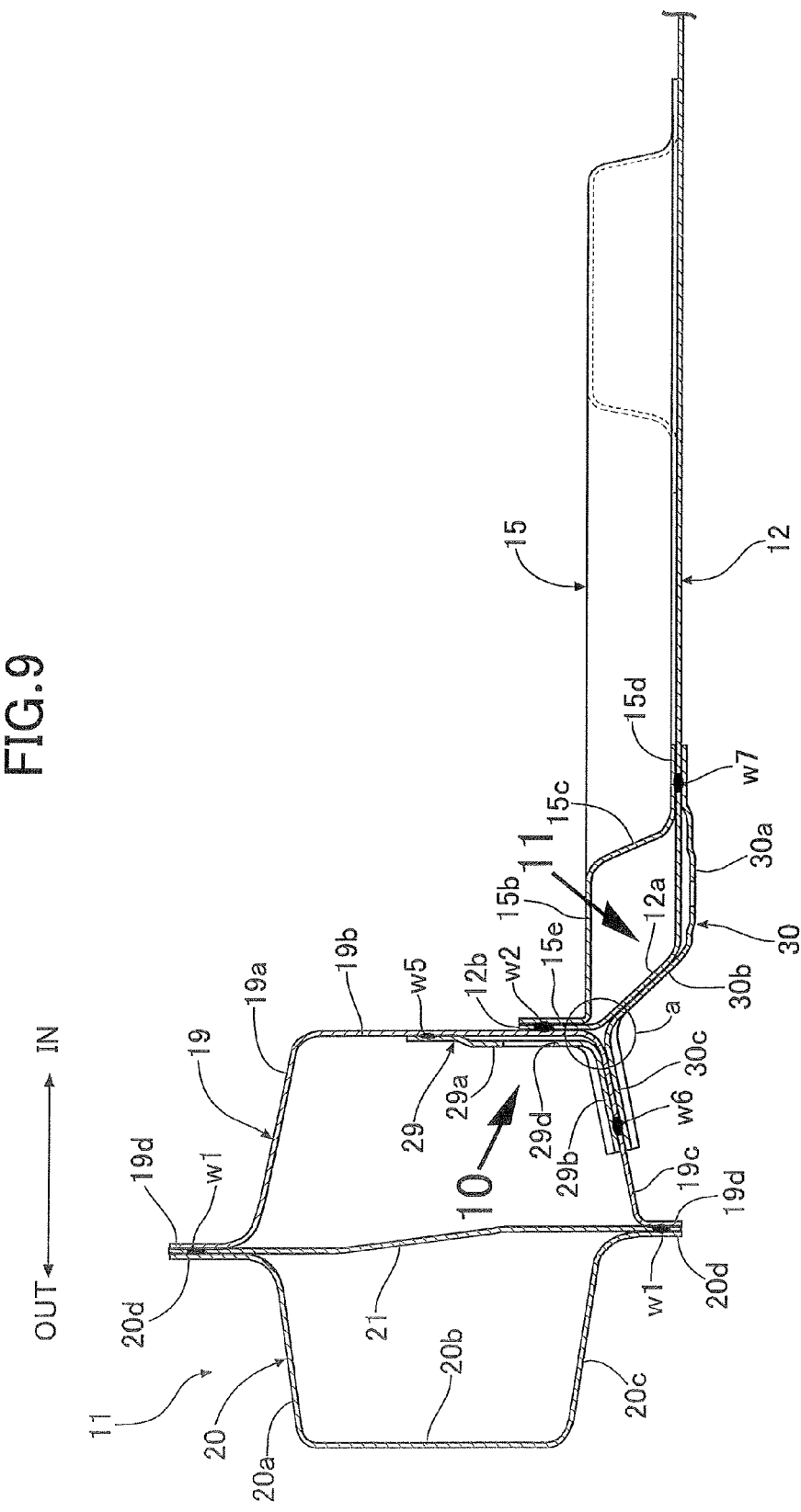
Figure 10:
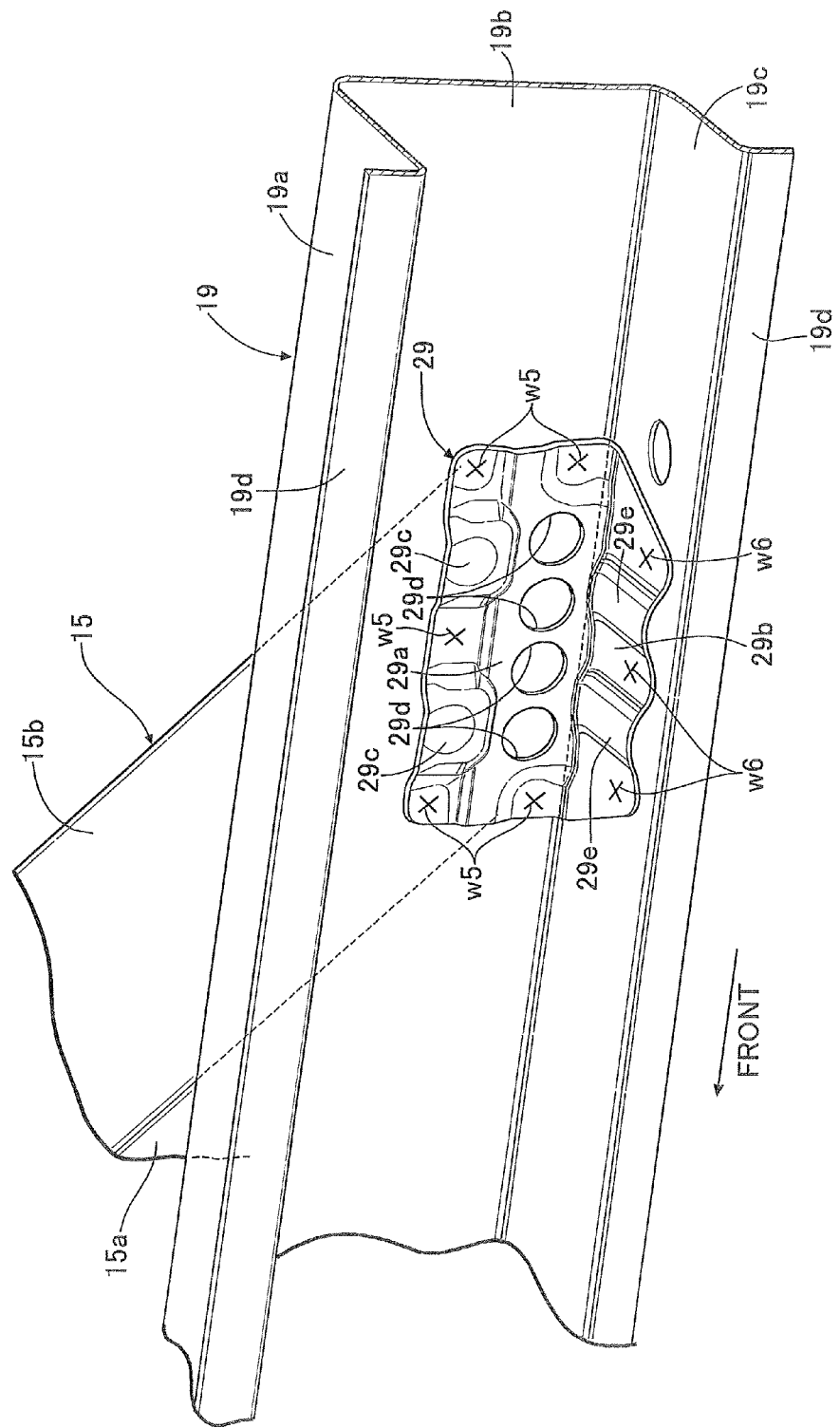
Figure 11:
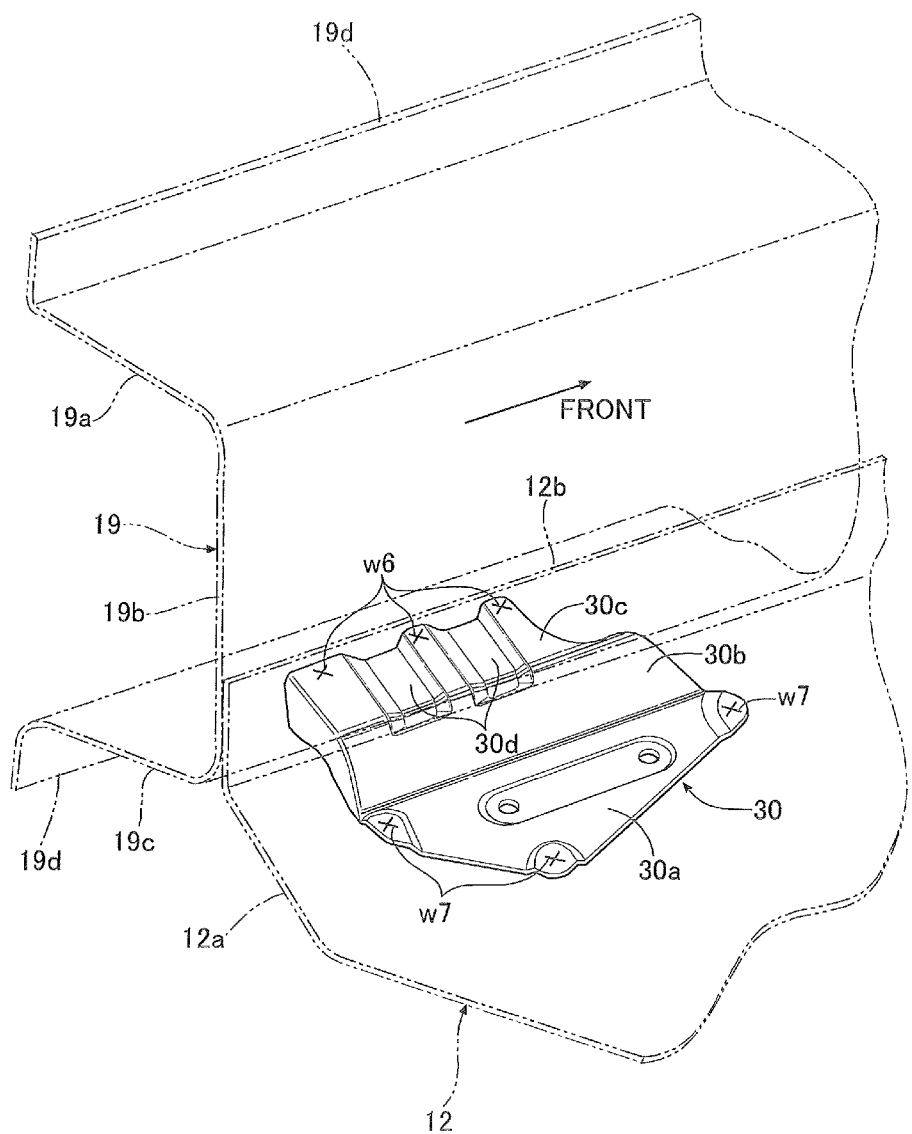

As apparent from FIG. 9, when the joint portion between the side sill 11 and the floor frame 15 is cut along a cross section orthogonal to a front-rear axis of the vehicle body, a polygonal line between the longitudinal wall 29a and the lateral wall 29b of the first reinforcement member 29 having the L-shaped cross section and the inclined wall 30b of the second reinforcement member 30 intersect each other in a Y shape at an intersection portion a, which is depicted surrounded by a circle in FIG. 9. The joint portion between the side sill 11 and the floor frame 15, i.e. a joint portion between a polygonal line of the side wall 19b and the lower wall 19c of the side sill inner 19 and a polygonal line of the upper wall 15b and the joint flange 15e of the floor frame 15, is located near the intersection portion a.

Figure 12:
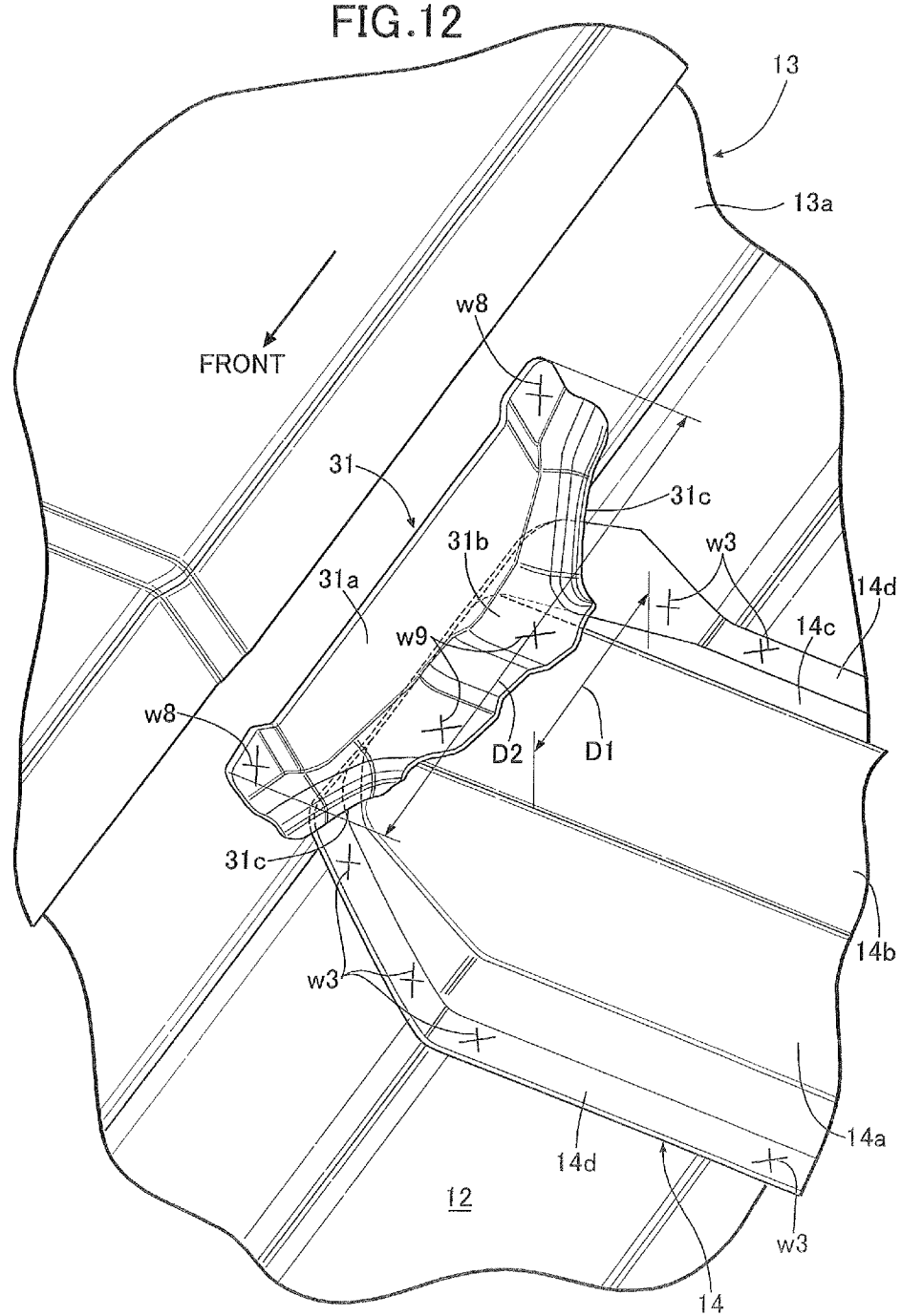

Next, with reference to FIG. 7 and FIG. 12, a detailed description will be given of a structure of a joint portion where an inner end in the vehicle width direction of the cross member 14 is connected to the floor tunnel 13.

The joint flanges 14d, 14d in the front and the rear of the cross member 14 are welded w3 to the upper surface of the front floor panel 12 and the side wall 13a of the floor tunnel 13. In addition to this, the upper wall 14b of the cross member 14 is connected to the side wall 13a of the floor tunnel 13 by means of a third reinforcement member 31. The third reinforcement member 31 is a member having an L-shaped cross section, and including a longitudinal wall 31a and a lateral wall 31b. The longitudinal wall 31a is spot-welded w8 to the side wall 13a of the floor tunnel 13, and the lateral wall 31b is spot-welded w9 to the upper wall 14b of the cross member 14.

A length D2 in a front-rear direction of the third reinforcement member 31 is larger than a width D1 in the front-rear direction of the upper wall 14b of the cross member 14. For this reason, a front portion and a rear portion of the lateral wall 31b project from the upper wall 14b of the cross member 14 to the front and the rear, respectively. Bent portions 31c, 31c which are bent downward are formed at edges on outer sides in the vehicle width direction of the projecting portions.

Next, operations of the embodiment of the present invention including the above configuration will be described.

If the side sill 11 moves to the rear by an impact load generated when an automobile causes a narrow offset frontal impact, stress is concentrated on a portion with strength difference such as a joint portion between the side sill 11 and a center pillar. For this reason, the side sill 11 is bent at the portion and a rear door becomes difficult to open in some cases involving conventional structures. However, according to the present embodiment, even if the side sill 11 moves to the rear, the backward movement of the side sill 11 is suppressed because the side sill 11 is firmly connected to an outer end in the vehicle width direction of the floor frame 15 through the first reinforcement member 29 and the second reinforcement member 30, and the bending of the side sill 11 can be accordingly prevented.

In particular, the joint portion where the side sill 11 and the floor frame 15 are joined to each other is located near the Y-shaped intersection portion a (see FIG. 9) which is formed by: the first reinforcement member 29 superposed on an inner surface of the side sill inner 19 and the second reinforcement member 30 superposed on a lower surface of the front floor panel 12. For this reason, the joint portion is effectively reinforced by the first reinforcement member 29 and the second reinforcement member 30, and thus the backward movement of the side sill 11 can be reliably prevented. Moreover, since the first reinforcement member 29 and the second reinforcement member 30 reinforce only the joint portion between the side sill 11 and the floor frame 15, an increase in weight can be reduced to a minimum.

In addition, the first reinforcement member 29 has an L-shaped cross section, and is formed of the longitudinal wall 29a and the lateral wall 29b. The longitudinal wall 29a is welded w5 to an inner surface of the side wall 19b of the side sill inner 19. The lateral wall 29b is welded w6 to the second lateral wall 30c of the second reinforcement member 30 with the lower wall 19c of the side sill inner 19 interposed therebetween. The first lateral wall 30a of the second reinforcement member 30 is welded w7 to the joint flange 15d of the floor frame 15 with the front floor panel 12 interposed therebetween. Thereby, the lower wall 19c of the side sill inner 19, the lateral wall 29b of the first reinforcement member 29 and the second lateral wall 30c of the second reinforcement member 30 are superposed on one another in triple on the outer side in the vehicle width direction of the joint portion, whereas the front floor panel 12, the joint flange 15d of the floor frame 15 and the first lateral wall 30a of the second reinforcement member 30 are superposed on one another in triple on an inner side in the vehicle width direction of the joint portion. Thus, the strength of the joint portion between the side sill inner 19 and the floor frame 15 can be increased.

Further, a load of a narrow offset frontal impact inputted to the side sill 11 is transmitted from the cross member 14 to the floor tunnel 13, and the side sill 11 is prevented from deforming inward in the vehicle width direction by reaction force generated in the floor tunnel 13. Here, a portion where an inner end in the vehicle width direction of the cross member 14 is connected to the floor tunnel 13 is reinforced by the third reinforcement member 31. For this reason, sufficient reaction force is generated in the floor tunnel 13, and thus the deformation of the side sill 11 can be suppressed. Moreover, the bent portions 31c, 31c (see FIG. 12) are formed by downwardly bending the lateral wall 31b of the third reinforcement member 31 projecting to the front and the rear from the upper wall 15b of the floor frame 15. Thus, a floor carpet covering the third reinforcement member 31 is prevented from being damaged by being caught at edges of the lateral wall 31b.

Figure 13:
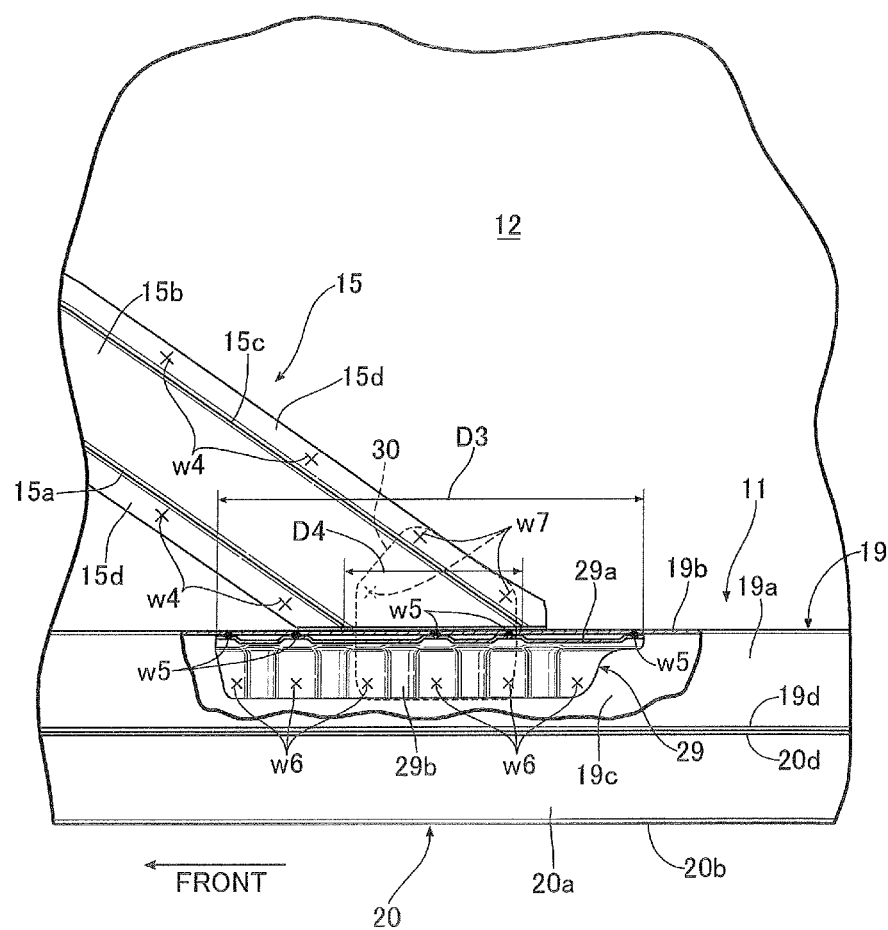
FIG. 13 shows a third embodiment of the present invention and corresponds to FIG. 8 of the second embodiment.

Next, a third exemplary embodiment of the present invention will be described with reference to FIG. 13.

In the second exemplary embodiment shown in FIG. 8, a length D3 in the front-rear direction of the first reinforcement member 29 is substantially the same as a width D4 in the front-rear direction of the floor frame 15 connected to the side sill 11. In the third exemplary embodiment, however, the first reinforcement member 29 is extended to the front and the rear, and the length D3 in the front-rear direction of the first reinforcement member 29 is larger than the width D4 in the front-rear direction of the floor frame 15 connected to the side sill 11.

Thereby, the reinforcement effect of the joint portion between the side sill 11 and the floor frame 15 is further increased by the first reinforcement member 29, and thus the bending of the side sill 11 can be further reliably prevented.

Although exemplary embodiments of the present invention have been described above, various design changes can be made within the scope not departing from the gist of the present invention.

For example, in the disclosed embodiments, the side wall 18e of the second member 18 is in contact with the side wall 15a on the outer side in the vehicle width direction of the floor frame 15. However, by forming a minute gap between both side walls 18e, 15a, both side walls 18e, 15a may be brought into contact with each other when an inward load in the vehicle width direction is inputted to the floor gusset 22.

In addition, a frame member of the present invention is not limited to the floor frame 15 of the exemplary embodiments, and the cross member 14 may be used as the frame member. In this case, an inner end in the vehicle width direction of the cross member 14 may be connected to the side sill 11 by the first reinforcement member 29 and the second reinforcement member 30.

What is claimed is:

1. A vehicle body floor structure for an automobile, comprising:
a dashboard lower panel and a front floor panel which are connected on a joint line extending in a vehicle width direction between a rear edge of the dashboard lower panel and a front edge of the front floor panel;

a side sill extending in a front-rear direction which is connected to an outer edge in the vehicle width direction of each of the dashboard lower panel and the front floor panel;

a floor frame member extending in the front-rear direction which is connected to an upper surface of each of the dashboard lower panel and the front floor panel on a side inward of the side sill in the vehicle width direction; and a floor gusset extending in the vehicle width direction and connecting the side sill and the floor frame member, and which is disposed on the upper surface of the front floor panel along the joint line.

2. The vehicle body floor structure for an automobile according to claim 1, wherein the floor gusset is connected, with bolts, to an inner surface in the vehicle width direction of the side sill and an upper surface of the floor frame.

3. The vehicle body floor structure for an automobile according to claim 1, wherein the floor gusset has a closed section and is formed by connecting a first member forming an upper wall to a second member forming a lower wall, a front wall and a rear wall, a first connection portion formed by upwardly bending an outer end in the vehicle width direction of the upper wall is connected to an inner surface in the vehicle width direction of the side sill, a second connection portion formed by extending an inner end in the vehicle width direction of the upper wall inward in the vehicle width direction is connected to an upper surface of the floor frame, and a side wall formed by upwardly bending an inner end in the vehicle width direction of the lower wall is made to face an outer surface in the vehicle width direction of the floor frame.

4. The vehicle body floor structure for an automobile according to claim 3, wherein a third connection portion formed by bending an upper end of the side wall inwardly in the vehicle width direction is connected to the upper surface of the floor frame while superposed on the second connection portion.

5. The vehicle body floor structure for an automobile according to claim 3, wherein a bulge portion which bulges downward is formed on the lower wall continuous to an outer side in the vehicle width direction of the side wall.

6. The vehicle body floor structure for an automobile according to claim 3, wherein the second connection portion is connected to the upper surface of the floor frame with a bolt, and a bead which projects to a same height as a head portion of the bolt and extends in the vehicle width direction is formed on the upper wall.

7. The vehicle body floor structure for an automobile according to claim 6, wherein the first connection portion is connected to the inner surface of the side sill with a bolt.

8. The vehicle body floor structure for an automobile according to claim 3, wherein a bead which extends in the vehicle width direction is formed on the lower wall.

9. The vehicle body floor structure for an automobile according to claim 3, wherein a gap is formed at a connection portion between the first member and the second member.

10. The vehicle body floor structure for an automobile according to claim 9, wherein the gap is configured to permit a rust-proofing paint to flow into and out of a hollow space within the floor gusset.

11. The vehicle body floor structure for an automobile according to claim 1, wherein the frame member includes an end portion which is joined to a side wall, on an inside in the vehicle width direction, of the side sill, and in a cross section orthogonal to a front-rear axis of the vehicle body, a joint portion between the side sill and the frame member is located near a Y-shaped intersection portion and includes a first reinforcement member which is superposed on an inner surface of the side sill and a second reinforcement member which is superposed on a lower surface of the front floor panel.

12. The vehicle body floor structure for an automobile according to claim 11, wherein the first reinforcement member has an L-shaped section formed of a longitudinal wall and a lateral wall, the longitudinal wall is welded to an inner surface of the side wall of the side sill, the lateral wall is welded to a portion on an outer side in the vehicle width direction of the second reinforcement member with a lower wall of the side sill interposed therebetween, and a portion on an inner side in the vehicle width direction of the second reinforcement member is welded to the frame member with the front floor panel interposed therebetween.

13. The vehicle body floor structure for an automobile according to claim 11, wherein a front end of the first reinforcement member is located frontward of a front end of the frame member in the joint portion, and a rear end of the first reinforcement member is located rearward of a rear end of the frame member in the joint portion.

14. The vehicle body floor structure for an automobile according to claim 11, further comprising: a floor tunnel formed on the front floor panel; and another frame member extending in the vehicle width direction and connecting the side sill and the floor tunnel, wherein a joint portion between the other frame member extending in the vehicle width direction and the floor tunnel is reinforced by a third reinforcement member which includes a lateral wall joined to an upper wall of the other frame member and a longitudinal wall joined to a side wall of the floor tunnel.

15. The vehicle body floor structure for an automobile according to claim 14, wherein the lateral wall of the third reinforcement member projecting from the upper wall of the other frame member to the front and the rear is bent downward.

16. The vehicle body floor structure for an automobile according to claim 12, further comprising: a floor tunnel formed on the front floor panel; and another frame member extending in the vehicle width direction and connecting the side sill and the floor tunnel, wherein a joint portion between the other frame member extending in the vehicle width direction and the floor tunnel is reinforced by a third reinforcement member which includes a lateral wall joined to an upper wall of the other frame member and a longitudinal wall joined to a side wall of the floor tunnel.

17. The vehicle body floor structure for an automobile according to claim 16, wherein the lateral wall of the third reinforcement member projecting from the upper wall of the other frame member to the front and the rear is bent downward.

18. The vehicle body floor structure for an automobile according to claim 1, further comprising: a floor tunnel formed on the front floor panel; and another frame member extending in the vehicle width direction and connecting the side sill and the floor tunnel, wherein a joint portion between the other frame member extending in the vehicle width direction and the floor tunnel is reinforced by a reinforcement member which includes a lateral wall joined to an upper wall of the other frame member and a longitudinal wall joined to a side wall of the floor tunnel.

19. The vehicle body floor structure for an automobile according to claim 18, wherein the lateral wall of the reinforcement member projecting from the upper wall of the other frame member to the front and the rear is bent downward.

\* \* \* \* \*